(12) United States Patent
Suyama et al.

(10) Patent No.: US 7,813,840 B2
(45) Date of Patent: Oct. 12, 2010

(54) COMFORTABLE ENVIRONMENT PROVIDING APPARATUS

(75) Inventors: Mari Suyama, Aichi (JP); Toshinobu Mizutani, Aichi (JP); Masato Nishikawa, Aichi (JP)

(73) Assignee: Kabushiki Kaisha Tokai Rika Denki Seisakusho, Gifu (JP)

( * ) Notice: Subject to any disclaimer, the term of this patent is extended or adjusted under 35 U.S.C. 154(b) by 412 days.

(21) Appl. No.: 11/936,983

(22) Filed: Nov. 8, 2007

(65) Prior Publication Data

US 2008/0114495 A1    May 15, 2008

(30) Foreign Application Priority Data

Nov. 10, 2006    (JP)    ............. 2006-305462

(51) Int. Cl.
G05D 23/00    (2006.01)
A61B 5/04    (2006.01)

(52) U.S. Cl. ............... 700/276; 700/300; 340/539.12; 340/576; 340/586; 600/390

(58) Field of Classification Search ............. 700/276, 700/277, 278, 299, 300; 340/573.1, 576, 340/586, 539.11, 539.12; 600/384, 390, 600/393
See application file for complete search history.

(56) References Cited

U.S. PATENT DOCUMENTS 4,889,131 A * 12/1989 Salem et al. .............. 600/484

| 7,187,292 | B2 | 3/2007 | Hayashi et al. |
| 7,260,950 | B2 | 8/2007 | Choi et al. |
| 2004/0263337 | A1* | 12/2004 | Terauchi et al. ....... 340/573.1 |
| 2009/0149721 | A1 | 6/2009 | Yang |
| 2009/0204262 | A1* | 8/2009 | Nishimura ................. 700/276 |

FOREIGN PATENT DOCUMENTS

| JP | 05-001838 | 1/1993 |
| JP | 2004-125376 | 4/2004 |
| JP | 2005-034520 | 2/2005 |
| WO | WO 2006035583 A1 * | 4/2006 |
| WO | WO 2006/045223 A1 | 5/2006 |

* cited by examiner

*Primary Examiner*—Ryan A Jarrett
(74) *Attorney, Agent, or Firm*—Patterson Thuente Christensen Pedersen, PA

(57) ABSTRACT

A comfortable environment providing apparatus for controlling at least one comfortable environment creation devices that creates a comfortable environment to provide a user with a comfortable environment. The comfortable environment providing apparatus includes a sensor unit for monitoring a condition related to the user and outputting data representing the monitored condition when carried by the user. A control circuit executes control of the at least one comfortable environment creation devices so that the monitored data approaches comfortable environment reference data quantitatively or numerically indicating a comfortable environment.

10 Claims, 2 Drawing Sheets

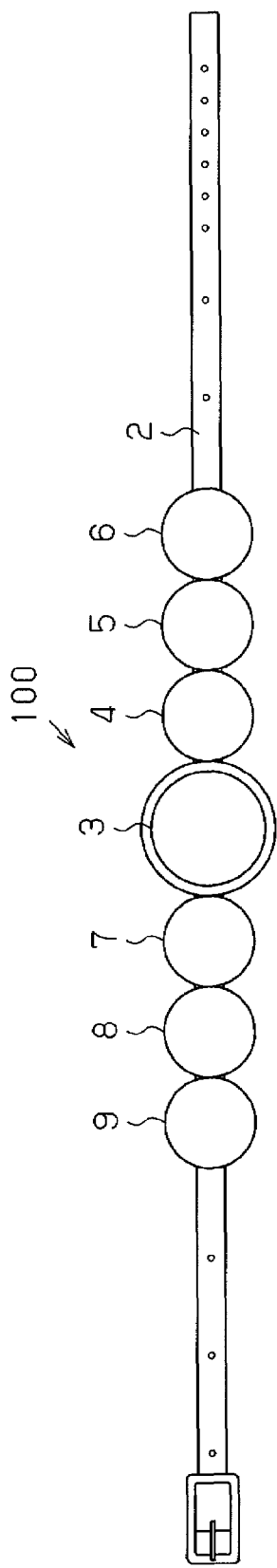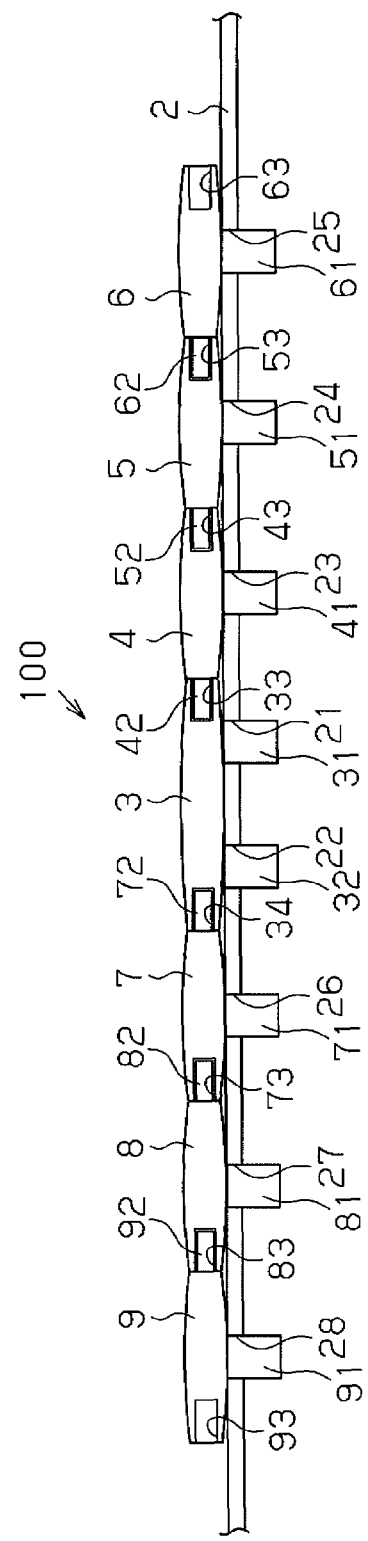

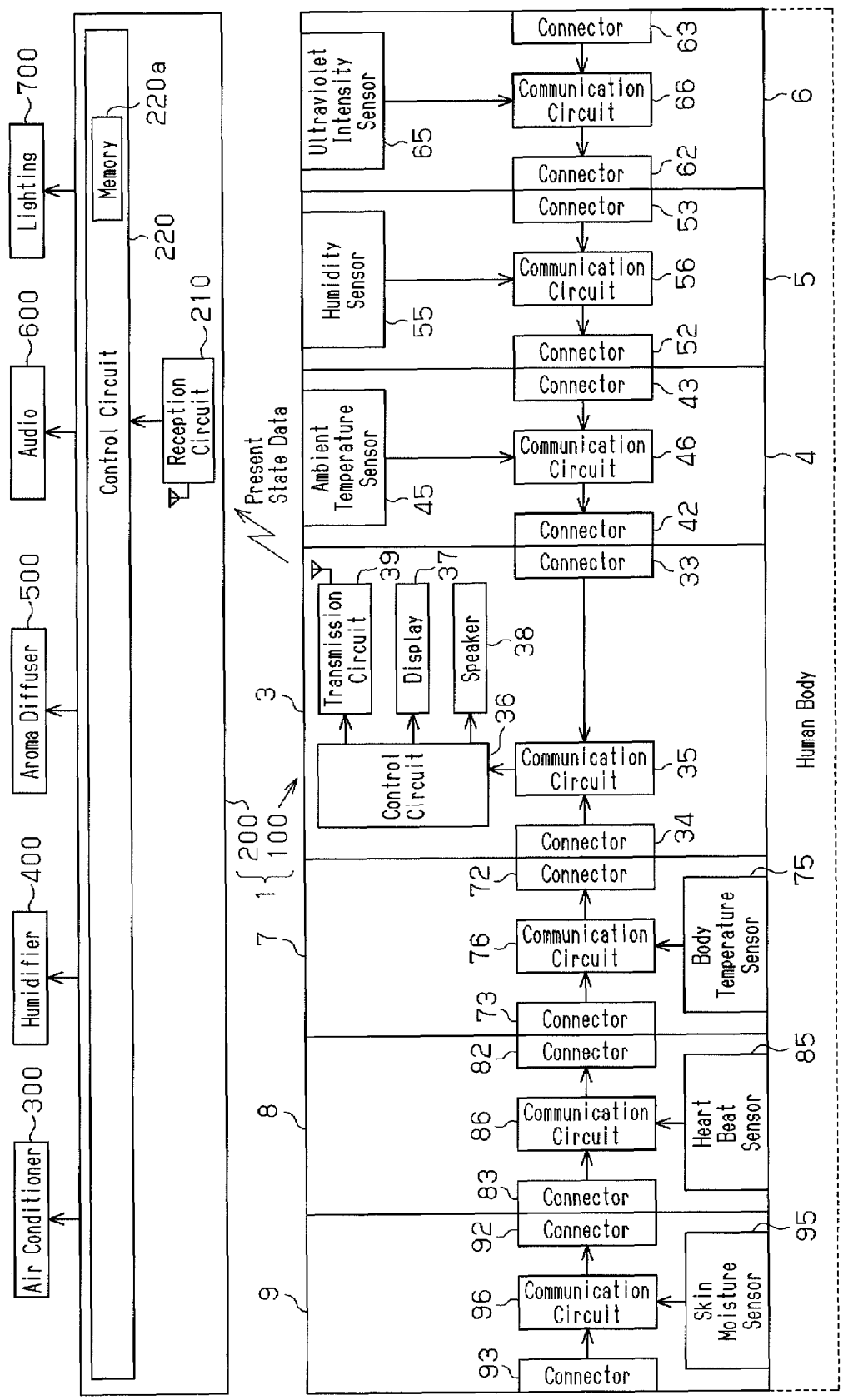

COMFORTABLE ENVIRONMENT PROVIDING APPARATUS

RELATED APPLICATION

The present application claims the benefit of priority to Japanese Patent Application No. 2006-305462 filed on Nov. 10, 2006. Said application is incorporated by reference herein.

BACKGROUND OF THE INVENTION

The present invention relates to a comfortable environment providing apparatus for providing a comfortable environment.

Japanese Laid-Open Patent Publication No. 2005-34520 describes a physical state monitoring system including a perspiration sensor arranged in a portable device carried by a driver. The portable device transmits data associated with the driver's perspiration amount, which is detected by the sensor. The data is received by an automobile. The automobile determines the physical state of the driver obtained from the data and shows the physical state on a display unit. A heart beat (pulse) sensor or a blood pressure sensor may be arranged in the portable device in lieu of or in addition to the perspiration sensor. In such a case, the driver's physical state is determined from the driver's heart beat (pulse) or blood pressure in lieu of or in addition to the driver's perspiration amount and shown on the display.

SUMMARY OF THE INVENTION

The physical state monitoring system of the above publication provides for visualization of the physical state of a driver based on sensor detection data. However, when the physical state of the driver deteriorates, the system does not advise on what the driver should do. Accordingly, when the physical state monitoring system informs the driver that his or her physical state has deteriorated, the driver must think of the actions required to improve his or her physical state. This may be burdensome to the driver.

For example, when the driver is exposed to cold and dry air, the physical state monitoring system generates a message indicating drying of the skin. When the driver sees the message, the driver understands that a humidifier must be operated to improve the dry state of his or her skin. However, the humidifier must be operated by the driver. This may be burdensome to the driver.

In addition to the drying of the skin, the physical state monitoring system may show a message indicating decrease in the skin temperature. In such a case, the driver understands that the air conditioner temperature must be raised to increase the skin temperature. However, the air conditioner must be operated by the driver. This may be burdensome to the driver.

In this manner, when the driver has to operate a plurality of air conditioning devices, the driver may feel further burdened.

The present invention provides an apparatus that conveniently provides a user with a comfortable environment.

One aspect of the present invention is a comfortable environment providing apparatus for controlling at least one comfortable environment creation devices to provide a user with a comfortable environment. The comfortable environment providing apparatus includes a sensor unit for monitoring a condition related to the user and outputting data representing the monitored condition when carried by the user. A control circuit executes control of the at least one comfortable environment creation devices so that the detection data approaches comfortable environment reference data quantitatively or numerically indicating a comfortable environment.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1(a) is a plan view of a condition monitoring device according to a preferred embodiment of the present invention;

FIG. 1(b) is a partially enlarged cross-sectional view of the condition monitoring device of FIG. 1(a); and FIG. 2 is a block diagram of a comfortable environment providing apparatus according to a preferred embodiment of the present invention.

DETAILED DESCRIPTION OF THE PREFERRED EMBODIMENTS

A comfortable environment providing apparatus according to a preferred embodiment of the present invention will now be described. In the preferred embodiment, the comfortable environment providing apparatus monitors the environmental state and physical state of a user and provides a comfortable environment in accordance with the monitoring result.

As shown in FIG. 2, a comfortable environment providing system 1 includes a condition monitoring device 100, which is carried by a user, and an environment adjustment device 200, which controls at least one comfortable environment creation devices for creating a comfortable environment. In the illustrated embodiment, the comfortable environment creation devices include an air conditioner 300, a humidifier 400, an aroma diffuser 500, audio equipment 600, and a lighting device 700.

The condition monitoring device 100 will first be discussed.

As shown in FIGS. 1(a) and 1(b), the condition monitoring device 100 includes a monitor main unit 3 attached to a band 2, which functions as a supporting member. An ambient temperature sensor unit 4, a humidity sensor unit 5, and an ultraviolet sensor unit 6 are connected in series along the band 2 in this order at one side of the monitor main unit 3. A body temperature sensor unit 7, a heart beat sensor unit 8, and a skin moisture sensor unit 9 are connected in series along the band 2 in this at the other side of the monitor main unit 3. The user puts on the condition monitoring device 100 by wearing the band 2 on his or her arm. The condition monitoring device 100 is also referred to as a portable remote condition monitoring device or a wearable condition monitoring device.

The ambient temperature sensor unit 4, the humidity sensor unit 5, the ultraviolet sensor unit 6, the body temperature sensor unit 7, the heart beat sensor unit 8, and the skin moisture sensor unit 9 are each smaller than the monitor main unit 3. In the preferred embodiment, the sensor units 4 to 9 are circular and have identical shapes and dimensions. Each sensor unit 4 to 9 has a thickness that is substantially the same as that of the monitor main unit 3. Each sensor unit 4 to 9 is one example of an external sensor unit.

The band 2 has flexibility and is elastically deformable. Two attachment holes 21 and 22 extend through the longitudinally middle part of the band 2. The attachment hole 21 is formed slightly towards a distal end of the band 2 from a longitudinally central point of the band 2. The attachment hole 22 is formed slightly towards a basal end of the band 2 from the longitudinal central point of the band 2. Two pins 31 and 32 are formed at a central part of the rear surface of the monitor main unit 3. The monitor main unit 3 is detachably attached to the band 2 by fitting the pin 31 into the attachment hole 21 and fitting the pin 32 into the attachment hole 22.

The pins 31 and 32 each have a diameter that is slightly larger than that of the attachment holes 21 and 22. The pins 31 and 32 are press-fitted to the attachment holes 21 and 22 against the elastic force of the band 2. The pins 31 and 32 each have a length that is greater than the depth of the attachment holes 21 and 22, that is, the thickness of the band 2. The pins 31 and 32 each have a distal end face that comes into close contact with a user's arm when the band 2 is worn. The projecting length of the pins 31 and 32 from the rear surface of the band 2 is set so that the user does not feel pain at the arm when wearing the band 2. The distal end face of each of the pins 31 and 32 may be rounded so that the user does not feel pain at the arm.

The distal end face of each of the pins 31 and 32 defines a surface that contacts the user's arm. A reference potential electrode and a communication electrode are exposed from the distal end face of the pin 31 and the distal end face of the pin 32. The reference potential electrode and the communication electrode use the user's body as a signal transmission path so as to realize in-body communication between the condition monitoring device 100 and the automobile. The reference potential electrode, the communication electrode, and the in-body communication are not essential parts of the present embodiment and thus will not be described in detail.

A line of spaced attachment holes 23 to 25 are formed towards the distal end of the band 2 from the attachment hole 21. A line of spaced attachment holes 26 to 28 are formed towards the basal end of the band 2 from the attachment hole 22. The attachment holes 23 to 28 have the same diameter.

A pin 41 is formed at the middle part of the rear surface of the ambient temperature sensor unit 4. The ambient temperature sensor unit 4 is detachably attached to the band 2 by fitting the pin 41 into the attachment hole 23.

The pin 41 has a diameter that is slightly greater than that of the attachment hole 23. The pin 41 is press-fitted to the attachment hole 23 against the elastic force of the band 2. The pin 41 has a length that is greater than the depth of the attachment hole 23, that is, the thickness of the band 2. The pin 41 has a distal end face that comes into close contact with the user's arm of the user when the band 2 is worn. The projecting length of the pin 41 from the rear surface of the band 2 is set so that the user does not feel pain at the arm when the band 2 is worn. The distal end face of the pin 41 may be rounded so that the user does not feel pain at the arm.

In the ambient temperature sensor unit 4, an ambient temperature sensor is exposed from a front surface, which is opposite the rear surface of the pin 41. The temperature sensor detects the ambient temperature (also referred to as environmental temperature) at the location of the user. The ambient temperature is one parameter of the user's environmental state.

A pin 51 is formed at a middle part of the rear surface of the humidity sensor unit 5. The humidity sensor unit 5 is detachably attached to the band 2 by fitting the pin 51 into the attachment hole 24.

The pin 51 has a diameter that is slightly larger than that of the attachment hole 24. The pin 51 is press-fitted to the attachment hole 24 against the elastic force of the band 2. The pin 51 has a length that is greater than the depth of the attachment hole 24, that is, the thickness of the band 2. The pin 51 has a distal end face that comes into close contact with the user's arm when the band 2 is worn. The projecting length of the pin 51 from the rear surface of the band 2 is set so that the user does not feel pain at the arm when the band 2 is worn. The distal end face of the pin 51 may be rounded so that the user does not feel pain at the arm.

In the humidity sensor unit 5, a humidity sensor is exposed from a front surface, which is opposite the rear surface of the pin 51. The humidity sensor detects the humidity at the location of the user. The humidity is one parameter of the user's environmental state.

A pin 61 is formed at a middle part of the rear surface of the ultraviolet sensor unit 6. The ultraviolet sensor unit 6 is detachably attached to the band 2 by fitting the pin 61 into the attachment hole 25.

The pin 61 has a diameter that is slightly larger than that of the attachment hole 25. The pin 61 is press-fitted to the attachment hole 25 against the elastic force of the band 2. The pin 61 has a length that is greater than the depth of the attachment hole 25, that is, the thickness of the band 2. The pin 61 has a distal end face that comes into close contact with the user's arm when the band 2 is worn. The projecting length of the pin 61 from the rear surface of the band 2 is set so that the user does not feel pain at the arm when the band 2 is worn. The distal end face of the pin 61 may be rounded so that the user does not feel pain at the arm.

In the ultraviolet sensor unit 6, an ultraviolet sensor is exposed from a front surface, which is opposite the rear surface of the pin 61. The ultraviolet sensor detects the intensity or dose of ultraviolet light received by the user. The intensity or dose of ultraviolet light is one parameter of the user's environmental state.

A pin 71 is formed at the middle part of the rear surface of the body temperature sensor unit 7. The body temperature sensor unit 7 is detachably attached to the band 2 by fitting the pin 71 into the attachment hole 26.

The pin 71 has a diameter that is slightly greater than that of the attachment hole 26. The pin 71 is press-fitted to the attachment hole 26 against the elastic force of the band 2. The pin 71 has a length that is greater than the depth of the attachment hole 26, that is, the thickness of the band 2. The pin 71 has a distal end face that comes into close contact with the user's arm when the band 2 is worn. The projecting length of the pin 71 from the rear surface of the band 2 is set so that the user does not feel pain at the arm when the band 2 is worn. The distal end face of the pin 71 may be rounded so that the user does not feel pain at the arm.

The distal end face of the pin 71 defines a surface that contacts the user's arm. A body temperature sensor is exposed from the distal end face of the pin 71. The body temperature sensor detects the user's skin temperature. The skin temperature is one parameter of the user's physical state.

A pin 81 is formed at the middle part of the rear surface of the heart beat sensor unit 8. The heart beat sensor unit 8 is detachably attached to the band 2 by fitting the pin 81 into the attachment hole 27.

The pin 81 has a diameter that is slightly larger than that of the attachment hole 27. The pin 81 is press-fitted to the attachment hole 27 against the elastic force of the band 2. The pin 81 has a length that is greater than the depth of the attachment hole 27, that is, the thickness of the band 2. The pin 81 has a distal end face that comes into close contact with the user's arm when the band 2 is worn. The projecting length of the pin 81 from the rear surface of the band 2 is set so that the user does not feel pain at the arm when the band 2 is worn.

The distal end face of the pin 81 may be rounded so that the user does not feel pain at the arm.

The distal end face of the pin 81 defines a surface that contacts the user's arm. A heart beat sensor is exposed from the distal end face of the pin 81. The heart beat sensor detects the heart beat of the user. The heart beat is one parameter of the user's physical state.

A pin 91 is formed at the middle part of the rear surface of the skin moisture sensor unit 9. The skin moisture sensor unit 9 is detachably attached to the band 2 by fitting the pin 91 into the attachment hole 28.

The pin 91 has a diameter that is slightly larger than that of the attachment hole 28. The pin 91 is press-fitted to the attachment hole 28 against the elastic force of the band 2. The pin 91 has a length that is greater than the depth of the attachment hole 28, that is, the thickness of the band 2. The pin 91 has a distal end face that comes into close contact with the user's arm when the band 2 is worn. The projecting length of the pin 91 from the rear surface of the band 2 is set so that the user does not feel pain at the arm when the band 2 is worn. The distal end face of the pin 91 may be rounded so that the user does not feel pain at the arm.

The distal end face of the pin 91 defines a surface that contacts the user's arm. A skin moisture sensor is exposed from the distal end face of the pin 91. The skin moisture sensor detects the user's skin moisture content. The skin moisture content is one parameter of the user's physical state.

A first connection structure is formed in the side of the monitor main unit 3. The first connection structure is formed by a recess such as a female connector 33. A second connection structure is formed opposite to the female connector 33 in the side of the monitor main unit 3. The second connection structure is formed by a recess such as a female connector 34.

A first connector that mates with the female connector 33 (first connection structure) is formed in the side of the ambient temperature sensor unit 4, which serves as a first sensor unit. The first connector is formed by a projection such as a male connector 42. The ambient temperature sensor unit 4 is detachably attached to the monitor main unit 3 by fitting the male connector 42 to the female connector 33. A second connector is formed opposite to the male connector 42 in the side of the ambient temperature sensor unit 4. The second connector is formed by a recess such as a female connector 43.

A third connector that mates with the female connector 43 (second connector) is formed in the side of the humidity sensor unit 5, which serves as a second sensor unit. The third connector is formed by a projection such as a male connector 52. The humidity sensor unit 5 is detachably attached to the ambient temperature sensor unit 4 by fitting the male connector 52 to the female connector 43. A fourth connector is formed opposite to the male connector 52 in the side of the humidity sensor unit 5. The fourth connector is formed by a recess such as a female connector 53.

A male connector 62 that mates with the female connector 53 (fourth connector) is formed in the side of the ultraviolet sensor unit 6, which serves as a third sensor unit. The ultraviolet sensor unit 6 is detachably attached to the humidity sensor unit 5 by fitting the male connector 62 to the female connector 53. A female connector 63 is formed opposite to the male connector 62 in the side of the ultraviolet sensor unit 6. The female connector 63 does not receive any male connector in the present embodiment.

A fifth connector that mates with the female connector 34 (second connection structure) is formed in the side of the body temperature sensor unit 7, which serves as a fourth sensor unit. The fifth connector is formed by a projection such as a male connector 72. The body temperature sensor unit 7 is detachably attached to the monitor main unit 3 by fitting the male connector 72 to the female connector 34. A sixth connector is formed opposite to the male connector 72 in the side of the body temperature sensor unit 7. The sixth connector is formed by a recess such as a female connector 73.

A seventh connector that mates with the female connector 73 (sixth connector) is formed in the side of the heart beat sensor unit 8, which serves as a fifth sensor unit. The seventh connector is formed by a projection such as a male connector 82. The heart beat sensor unit 8 is detachably attached to the body temperature sensor unit 7 by fitting the male connector 82 to the female connector 73. An eighth connector is formed opposite to the male connector 82 in the side of the heart beat sensor unit 8. The eighth connector is formed by a recess such as a female connector 83.

A male connector 92 that mates with the female connector 83 (eighth connector) is formed in the side of the skin moisture sensor unit 9, which serves as a sixth sensor unit. The skin moisture sensor unit 9 is detachably attached to the heart beat sensor unit 8 by fitting the male connector 92 to the female connector 83. A female connector 93 is formed opposite to the male connector 92 in the side of the skin moisture sensor unit 9. The female connector 93 does not receive any male connector in the present embodiment.

The female connectors 33, 34, 43, 53, 63, 73, 83, and 93 have the same structure. The male connectors 42, 52, 62, 72, 82, and 92 have the same structure. Therefore, in the present embodiment, except for its own sensor unit female connector, the male connectors 42, 52, 62, 72, 82, and 92 can each be mated with any one of the female connectors 33, 34, 43, 53, 63, 73, 83, and 93.

The female connectors 33, 34, 43, 53, 63, 73, 83, and 93 and male connectors 42, 52, 62, 72, 82, and 92 each have a contact or a terminal (not shown). When one female connector is fitted with one male connector, the contact or the terminal of the female connector is electrically connected to the contact or the terminal of the male connector. The sensor units 4 to 9 thus have connection compatibility.

The electrical configuration of the condition monitoring device 100 will now be described.

As shown in FIG. 2, the ambient temperature sensor unit 4 is electrically connected to the monitor main unit 3 of the condition monitoring device 100 by the female connector 33 and the male connector 42. The humidity sensor unit 5 is electrically connected to the ambient temperature sensor unit 4 by the female connector 43 and the male connector 52, and the ultraviolet sensor unit 6 is electrically connected to the humidity sensor unit 5 by the female connector 53 and the male connector 62.

The body temperature sensor unit 7 is electrically connected to the monitor main unit 3 of the condition monitoring device 100 by the female connector 34 and the male connector 72. The heart beat sensor unit 8 is electrically connected to the body temperature sensor unit 7 by the female connector 73 and the male connector 82, and the skin moisture sensor unit 9 is electrically connected to the heart beat sensor unit 8 by the female connector 83 and the male connector 92.

The ultraviolet sensor unit 6 detects the intensity or dose of ultraviolet light with an ultraviolet intensity or dose sensor 65 exposed from its front surface, converts the data representing the ultraviolet light intensity or dose with a communication circuit 66 into a format easily handled by the monitor main unit 3, and provides the converted data to an adjacent external device (in this case, the humidity sensor unit 5) through the male connector 62. The ultraviolet sensor unit 6 provides the data acquired from a preceding external device (in this case, there is no external device connected to the female connector 63) via the female connector 63 to the following external device (in this case, humidity sensor unit 5) via the communication circuit 66 and the male connector 62.

The humidity sensor unit 5 detects the humidity with a humidity sensor 55 exposed from its front surface, converts the data representing the ambient humidity with a communication circuit 56 into a format easily handled by the monitor main unit 3, and provides the converted data to the adjacent external device (in this case, ambient temperature sensor unit 4) via the male connector 52. The humidity sensor unit 5 provides the data acquired from the preceding external device (in this case, ultraviolet sensor unit 6) via the female connector 53 to the following external device (in this case, ambient temperature sensor unit 4) via the communication circuit 56 and the male connector 52.

The ambient temperature sensor unit 4 detects the ambient temperature with a temperature sensor 45 exposed from its front surface, converts the data representing the ambient temperature with a communication circuit 46 into a format easily handled by the monitor main unit 3, and provides the converted data to the adjacent external device (in this case, monitor main unit 3) via the male connector 42. The ambient temperature sensor unit 4 provides the data acquired from the preceding external device (in this case, humidity sensor unit 5) via the female connector 43 to the following external device (in this case, monitor main unit 3) via the communication circuit 46 and the male connector 42.

In the skin moisture sensor unit 9, a skin moisture sensor 95 detects the user's skin moisture content. A communication circuit 96 converts the data representing the user's skin moisture content to a format easily handled by the monitor main unit 3. Then, the communication circuit 96 provides the converted data to the adjacent external device (in this case, heart beat sensor unit 8) via the male connector 92. When there is a preceding external device connected to the skin moisture sensor unit 9 by the female connector 93 (in the preferred embodiment, there is no external device connected by the female connector 93), the skin moisture sensor unit 9 provides the data acquired from the preceding external device to the following external device (in this case, heart beat sensor unit 8) via the communication circuit 96 and the male connector 92.

In the heart beat sensor unit 8, a heart beat sensor 85 detects the user's heart beat. A communication circuit 86 converts the data representing the user's heart beat into a format easily handled by the monitor main unit 3. Then, the communication circuit 86 provides the converted data to the adjacent external device (in this case, body temperature sensor unit 7) via the male connector 82. The heart beat sensor unit 8 provides the data acquired from the preceding external device (in this case, skin moisture sensor unit 9) via the female connector 83 to the following external device (in this case, body temperature sensor unit 7) via the communication circuit 86 and the male connector 82.

In the body temperature sensor unit 7, a body temperature sensor 75 detects the user's skin temperature. A communication circuit 76 converts the data representing the user's skin temperature into a format easily handled by the monitor main unit 3. Then, the communication circuit 76 provides the converted data to the adjacent external device (in this case, monitor main unit 3) via the male connector 72. The body temperature sensor unit 7 provides the data acquired from the preceding external device (in this case, heart beat sensor unit 8) via the female connector 73 to the following external device (in this case, monitor main unit 3) via the communication circuit 76 and the male connector 72.

The monitor main unit 3 includes a communication circuit 35 that specifies the sensor units associated with the data acquired from the adjacent external device via the female connector 33 (in this case, the ambient temperature sensor unit 4). The communication circuit 35 further specifies the sensor units associated with the data acquired from the adjacent external device via the female connector 34 (in this case, the body temperature sensor unit 7). The communication circuit 35 of the monitor main unit 3 generates data in which the specification result and the level of data are associated and provides the data to a control circuit 36. The control circuit 36 analyzes the data and determines whether or not the user's present state must be improved. When determining that the user's present state must be improved, the control circuit 36 activates an informing device (for example, either one of a display 37 and a speaker 38) to inform the user of the present state.

The main unit 3 further includes a transmission circuit 39, which transmits data representing the user's present state to an external device through wireless communication, wired communication, or optical signals. The data of the present state transmitted from the transmission circuit 39 may be determination data representing determination results of the control circuit or detection data received by the control circuit 36 through the communication circuit 35.

The environment adjustment device 200 includes a reception circuit 210 and a control circuit 220. The reception circuit 210 receives the present state data transmitted from the condition monitoring device 100. The control circuit 220 determines the present state of the user from the present state data received by the reception circuit 210 and controls the comfortable environment creation devices 300 to 700 so as to provide a comfortable environment. In the preferred embodiment, the control circuit 220 generates control signals for providing a comfortable environment and sends the control signals to the comfortable environment creation devices 300 to 700. The control signals, which are electrical signals or optical signals, are sent to the comfortable environment creation devices 300 to 700 through wired communication or wireless communication.

The control circuit 220 includes a storage device such as a non-volatile memory 220a. The non-volatile memory 220a stores comfortable environment reference data indicating a comfortable environment quantitatively or numerically. The user's conditions are always changing. Thus, the present data received by the control circuit 220 is also always changing. The control circuit 220 controls the comfortable environment creation devices 300 to 700 so that the present state data received subsequently (next) approaches the comfortable environment reference data. In other words, the control circuit 220 controls the comfortable environment creation devices 300 to 700 so as to decrease the difference between the present state data and the comfortable environment reference data in the next detection. The contents of the control executed on the comfortable environment creation devices 300 to 700 may be informed to the user through the display 37 and the speaker 38. The comfortable environment reference data may include a plurality of comfort levels including a first comfort level and a second comfort level, which is different from (or higher than) the first comfort level.

Operation examples of the comfortable environment providing system 1 will now be discussed.

In one example, the user of the comfortable environment providing system 1 stops driving a vehicle during the wintertime and walks outdoor from a garage to his or her house.

In this case, the user may be exposed to cold and dry air for a long time such that the user's skin temperature becomes low and the user's skin moisture content decreases. As a result, the skin temperature detected by the body temperature sensor 75 becomes less than a reference skin temperature (enters an abnormal range). Further, the skin moisture content detected by the skin moisture sensor 95 becomes less than a reference skin moisture content (enters an abnormal range). Based on the data provided from the body temperature sensor 75 and the skin moisture sensor 95, the control circuit 36 determines that the user's skin temperature is less than the reference skin temperature and that the user's skin moisture content is less than the reference skin moisture content. Then, the control circuit 36 activates the display 37 and the speaker 38 to inform the user of his or her present state. In the preferred embodiment, the control circuit 36 shows a text message or a picture message (e.g., icon or dynamic image) on the display 37 of which content may be: "Since skin temperature is low, the air conditioner will be operated to warm the house. Since skin is dry, the humidifier will be operated." Further, the control circuit 36 outputs the content of the message from the speaker 38.

The control circuit 36 transmits the present state data (i.e., data indicating that the user's skin temperature is less than the reference skin temperature) to an external device via the transmission circuit 39.

The reception circuit 210 receives and sends the present state data to the control circuit 220. The control circuit 220 determines the user's present state based on the present state data or by processing the present state data. In the above example, the control circuit 220 determines that improvement should be made to the user's present state since the skin temperature is less than the reference skin temperature and the skin moisture content is less than the reference skin moisture content.

The comfortable environment reference data stored in the non-volatile memory 220 includes reference skin temperature data (e.g., data indicating the user's skin temperature under a comfortable environment) and reference skin moisture content data (e.g., data indicating the user's skin moisture content under a comfortable environment). In the above example, to raise the detected user's skin temperature to the reference skin temperature or the detected skin moisture content to the reference skin moisture content, the control circuit 220 activates the air conditioner 300 and the humidifier 400. The air conditioner 300 is operated to increase the room temperature, and the humidifier 400 is operated at maximum output. In this manner, the control circuit 220 controls the air conditioner 300 and the humidifier 400 so that the subsequently received present state data approaches the comfortable environment reference data.

Prior to execution of the control on the air conditioner 300 and the humidifier 400, the user is informed of the executed control content through the display 37 and the speaker 38. In the above example, a message is generated to inform the user of activation of the air conditioner 300 and humidifier 400. Further, a message is generated to inform the user that his or her skin temperature is low and his or her skin is dry. That is, the user is informed of his or her present state. Accordingly, the comfortable environment providing system 1 describes the user's present state to the user, announces the content of the control required to create a comfortable environment, and starts to operate the comfortable environment creation devices 300 to 700.

When the user reaches his or her home, the air conditioner 300 and the humidifier 400 have already started operation. Therefore, the indoor environment is sufficient for improving the user's physical state in which the skin temperature is low and the skin is dry. That is, the house is warm and has sufficient humidity. As long as the user stays indoors, the user's skin temperature and skin moisture content will return to normal. In such a state, the control circuit 36 acquires updated present data indicating that the user's skin temperature is within a predetermined range (e.g., normal range) relative to the reference skin temperature and that the user's skin moisture content is within a predetermined range (e.g., normal range) relative to the reference skin moisture content.

Based on the updated present state data, the control circuit 36 determines the user's most recent state in which the skin temperature and skin moisture amount have returned to normal. Then, the control circuit 36 activates the display 37 and the speaker 38 and informs the user of the present state. In the preferred embodiment, the control circuit 36 shows a text message or a picture message (e.g., icon or dynamic image) on the display 37 of which content may be: "Since skin temperature has returned to normal, air conditioner output will be lowered. Since skin moisture content has returned to normal, humidifier output will be lowered." Further, the control circuit 36 outputs the content of the message from the speaker 38.

The control circuit 36 transmits the most recent present state data (i.e., data indicating that the user's skin temperature is within the predetermined range relative to the reference skin temperature and data indicating that the user's skin moisture content is within the predetermined range relative to the reference skin moisture content) to the external device via the transmission circuit 39.

The reception circuit 210 receives the most recent present state data. Based on the most recent present state data, the control circuit 220 determines the user's present state. In this case, the control circuit 220 determines that in the present state, the user's skin temperature and skin moisture content have improved and returned to normal. In this state, there is no need for improvement. Then, the control circuit 220 ends the control and starts executing a new control on the air conditioner 300 and the humidifier 400. In the above example, the new control is for maintaining the comfortable environment. More specifically, the air conditioner 300 is operated at a low output to maintain a comfortable environment, and the humidifier 400 is operated at a low output to maintain sufficient indoor humidity.

Before executing the new control on the air conditioner 300 and the humidifier 400, the user is informed of the content of the new control through the display 37 and the speaker 38. In the above example, a message announcing output decrease of the air conditioner 300 and the humidifier 400 is issued by the display 37 and the speaker 38 before the output is actually decreased. In addition to this message, a message indicating the user's most recent state, that is, a message reporting that the skin temperature and skin moisture content have recovered, may be issued by the display 37 and the speaker 38. In this manner, the user's present state is described to the user, the content of the control required to create a comfortable environment is announced, and the control executed on the comfortable environment creation devices 300 to 700 is started.

The preferred embodiment has the advantages described below.

(1) The comfortable environment providing system 1 automatically controls the comfortable environment creation devices 300 to 700 so that the detection data from the sensor units 4 to 9 (present state data received by the control circuit 220) approaches the comfortable environment reference data stored in the non-volatile memory 220$a$. Accordingly, the comfortable environment providing system 1 automatically creates comfortable environment tailored to the user's individual state (the environmental state and physical state of the user) and provides the user with the automatically created comfortable environment without the user performing any operations. Thus, the comfortable environment providing system 1 is convenient for the user.

(2) When the comfortable environment providing system 1 detects that the user's present state should be improved, such as when the user's skin is dry, the comfortable environment providing system 1 controls the comfortable environment creation devices such as the humidifier 400 to improve the user's present state. Accordingly, the comfortable environment providing system 1 provides the user with an automatically created comfortable environment without the user performing any operations. Thus, the comfortable environment providing system 1 is convenient for the user.

(3) The comfortable environment providing system 1 controls the comfortable environment creation devices 300 to 700 so as to improve the user's condition. When detecting that the user's condition has been improved, the comfortable environment providing system 1 terminates the execution of the previous control. Then, the comfortable environment providing system 1 executes a new control on the comfortable environment creation devices 300 to 700 so as to maintain the comfortable environment. Accordingly, the comfortable environment providing system 1 provides the user with an automatically created comfortable environment without the user performing any operations. Thus, the comfortable environment providing system 1 is convenient for the user.

(4) Before execution of the control on the comfortable environment creation devices 300 to 700, the comfortable environment providing system 1 outputs the control content (i.e., operation of the air conditioner 300) through the display 37 and the speaker 38. Thus, the user is aware beforehand of the content of the control executed on the comfortable environment creation devices 300 to 700.

(5) Before execution of the control on the comfortable environment creation devices 300 to 700, the comfortable environment providing system 1 announces to the user of the execution of the control on the comfortable environment creation devices 300 to 700. Accordingly, when the user arrives at the location where the comfortable environment creation devices 300 to 700 are operated, the user is aware of the reasons the comfortable environment creation devices 300 to 700 are operating. Thus, the user is aware that he or she did not forget to turn off the comfortable environment creation devices 300 to 700.

(6) The comfortable environment providing system 1 describes the user's present state to the user (e.g., skin is dry), announces to the user of the control content (e.g., operation of the humidifier 400) required to create a comfortable environment, and then starts execution of the control on the comfortable environment creation devices 300 to 700. Since the user's present state is described to the user (i.e., skin is dry), the user is aware of why the comfortable environment creation devices 300 to 700 are being controlled. Thus, there is no misunderstanding by the user with regard to the operation of the comfortable environment providing system 1.

(7) The comfortable environment providing system 1 automatically creates an environment that is in accordance with the physical state of the user who is wearing the condition monitoring device 100. In the preferred embodiment, even when the user is severely ill and cannot operate the comfortable environment creation devices 300 to 700, the comfortable environment creation devices 300 to 700 are automatically operated to aid recovery of the user. Accordingly, the comfortable environment providing system 1 is beneficial for the user.

It should be apparent to those skilled in the art that the present invention may be embodied in many other specific forms without departing from the spirit or scope of the invention. Particularly, it should be understood that the present invention may be embodied in the following forms.

The non-volatile memory 220a may store condition data for specific conditions predicted beforehand in association with control content data indicating the control content of the comfortable environment creation devices 300 to 700 required to create a comfortable environment that is in accordance with the specific condition.

In one example, the specific condition may be a case in which the user becomes excited while driving a car. Normally, in a state of excitement, blood pressure rises, skin temperature increases, and heart beat increases. In such a case, condition data indicating a state of excitement (specific condition) includes data indicating that the user's skin temperature is greater than the reference skin temperature and data indicating that the user's heart beat is greater than the reference heart beat.

In one example, measures for improving the user's state, which is a state of excitement, and relaxing the user includes operation of the air conditioner 300 to lower the temperature of the passenger compartment, operation of the aroma diffuser 500 to diffuse the user's preferred aroma, and operation of the audio equipment 600 to play the user's preferred music. In one example, the control content data associated with the condition data includes data indicating operation of the air conditioner 300 so as to lower the passenger compartment temperature, data indicating operation of the aroma diffuser 500 to diffuse the user's preferred aroma, and data indicating operation of the audio equipment 600 to play the user's preferred music.

In this case, the control circuit 220 controls the comfortable environment creation devices 300 to 700 in accordance with the control content data associated with the condition data when detection data of a sensor unit (e.g., heart beat sensor unit 8) matches the condition data.

In this structure, the comfortable environment providing system 1 is operated in accordance with the control content data indicating the control content associated with a specific condition stored in the memory 220a. This provides the user with an optimally comfortable environment.

The comfortable environment providing system 1 may include an input device and storage device that enables the user to set a user-customized course, which controls and operates one or more of the comfortable environment creation devices so as to create a comfortable environment that is in accordance with the user's preferences. Control parameters (e.g., activated time, deactivated time, and output) of one or more comfortable environment creation devices may be input by the user with an input device and registered in a storage device. In one example, when executing the user-customized course, the comfortable environment providing system 1 provides the user with an aroma, music genre, tune, volume, light illumination, and the like in accordance with the user's preference in an intermittent manner or a predetermined order. In one example, the user-customize course is a relax course for improving a nervous or excited state.

The condition monitoring device 100 may output a confirmation message from the display 37 and the speaker 38 to confirm with the user whether the comfortable environment creation devices 300 to 700 may be controlled and operated in accordance with the announcement content. When receiving an affirmative response to the conformation message, the control circuit 220 starts to control and operate the comfortable environment creation devices 300 to 700. When a negative response is received from the user, the control circuit 220 does not operate and control the comfortable environment creation devices 300 to 700.

This structure prevents the comfortable environment creation devices 300 to 700 from being operated against the user's will.

In the preferred embodiment, a confirmation message of: "Skin temperature is low. Should the air conditioner in the house be operated to warm the rooms? Skin is dry. Should the humidifier be operated?" Then, when the user wants the air conditioner 300 and the humidifier 400 to be operated, the user performs an operation (operation of affirmative response). Data indicating that the operation has been performed is transmitted from the transmission circuit 39 to the environment adjustment device 200. As a result, the control circuit 220 starts to control and operate the air conditioner 300 and the humidifier 400.

The control circuit 220 may transmit a wireless or wired communication signal representing the content of the control required to create a comfortable environment from a transmission circuit (not shown) of the environment adjustment device 200 to a reception circuit (not shown) of the condition monitoring device 100.

The condition monitoring device 100 and the environment adjustment device 200 may perform wireless communication or wired communication therebetween. In one example, the condition monitoring device 100 and the environment adjustment device 200 perform communication therebetween with a cellular phone. Further, the condition monitoring device 100 and the environment adjustment device 200 may perform in-body communication therebetween in which the user's body is used as a signal transmission path. In this case, the reference potential electrode on the distal end face of the pin 31 and the communication electrode on the distal end face of the pin 32 may be used for the communication.

When performing wired communication, a connector for the environment adjustment device 200 may be arranged in a vehicle and connected with a connector for the condition monitoring device 100. The two connectors may be connected electrically or optically with a cable to perform communication through the cable.

Communication between the condition monitoring device 100 and the environment adjustment device 200 may be eliminated. In one example, the control circuit 36 of the condition monitoring device 100 includes the functions of the control circuit 220 (including the memory 220*a*) of the environment adjustment device 200, and the control circuit 36 directly controls the comfortable environment creation devices 300 to 700.

The environment adjustment device 200 may be an environment adjustment device for a building such as a remote controller that controls the comfortable environment creation devices 300 to 700 for the building. Alternatively, the environment adjustment device 200 may be an environment adjustment device for a vehicle such as a control panel that controls the comfortable environment creation devices 300 to 700 for the building. Further, the environment adjustment device 200 may control and operate the comfortable environment creation devices 300 to 700 for both a building and a vehicle.

The display 37 and the speaker 38 do not have to be incorporated in the main unit 3. For example, the display 37 and the speaker 38 may be arranged in a vehicle or a building. Alternatively, the display 37 and the speaker 38 may be arranged in both a vehicle and a building. In this case wired or wireless communication is performed between the condition monitoring device 100 and another independent informing device (i.e., an informing device that issues visual advice such as the display or an informing device that issues audible advice such as the speaker). The communication transmits data related with the content of advice from the condition monitoring device 100 to the other informing device. The other informing device that receives the data may generate advice such as those of the preferred embodiment or further detailed advice.

When arranging an independent informing device for showing a visual message (text, icon, dynamic images, etc.) or an independent informing device for issuing an audible message in a vehicle, the display or speaker for a car navigation system may be used as the independent informing devices. Further, when arranging an independent informing device in a building, a personal computer or home appliance (stereo equipment or television set) may be used as the independent informing device.

Such structures eliminate the need for the display 37 and the speaker 38 from the main unit 3, which is worn by the user. This enables reduction in size and weight of the main unit 3 and provides a compact wearable main unit 3. Further, instead of incorporating the display 37 in the main unit 3, a large external display may be use to a show a large amount of detailed information in a single screen. In this case, detailed advices may be issued through the external display.

Sensor units such as an atmospheric pressure sensor unit for detecting atmospheric pressure at the location of the user, an oxygen concentration sensor unit for detecting oxygen concentration at the location of the user, a blood pressure unit for detecting the user's blood pressure, a wrinkle advancement sensor unit for detecting the advancement of the user's wrinkles (or future advancement of wrinkles), a skin fineness sensor unit for detecting fineness of the user's skin, and a skin elasticity sensor unit for detecting elasticity of the user's skin may be used.

The condition monitoring device 100 is not limited to a wrist watch type device or bracelet type device worn on the user's arm, and may be a necklace type device or pendant type device worn around the neck of the user. Alternatively, the condition monitoring device 100 may be an eyeglass type device or a ring type device. If the conditions monitored by the condition monitoring device 100 is used as the user's physical information, it is preferred that the condition monitoring device 100 be shaped to come into close contact with the user. If the user of the condition monitoring device 100 is the driver of a vehicle, it is preferred that, for example, the monitor main unit 3 be integrated with a wrist watch, which is normally worn by the user regardless of whether or not the user rides the vehicle. In this case, the sensor units desired by the user are attachable to the wrist watch.

The supporting member is not limited to the band 2, and other supporting members, such as belt, a chain, a ring, eyeglasses, a safety pin, and the like may be used.

The monitor main unit 3 of the preferred embodiment may be used with an electronic key for a so-called keyless system that enables the locking and unlocking of a door for a vehicle, such as an automobile, or a building, such as a house, with a door lock controller when an unlock button or lock button of the electronic key is operated. In such a case, the monitor main unit 3 incorporates functions (keyless functions) necessary for the electronic key. For example, the monitor main unit 3 includes a function for transmitting an ID code signal including an unlock request code (lock request code) for requesting unlocking (locking) of the door and a unique ID code for the monitor main unit 3 (electronic key) when an unlock button (or a lock button) is operated. When such an ID code signal is received by the door lock controller, the ID code is verified with a reference ID code, and the unlocking (locking) of the door is enabled when the ID codes match.

Alternatively, the monitor main unit 3 of the preferred embodiment may be used with an electronic key for a so-called smart system that enables locking and unlocking of a door for a vehicle, such as an automobile, or a building, such as a house, with a door lock controller when the proper key is located near the door. In such a case, the monitor main unit 3 incorporates functions (keyless functions) necessary for the electronic key. For example, the monitor main unit 3 includes a function for transmitting an ID code signal including a unique ID code for the monitor main unit 3 (electronic key) in response to a request signal cyclically transmitted from a door lock controller that monitors the approach of the monitor main unit 3 to the door. When such an ID code signal is received by the door lock controller, the ID code is verified with a reference ID code, and the unlocking (locking) of the door is enabled when the ID codes match.

If the smart function is incorporated in the monitor main unit 3, in addition to the locking and unlocking of a door, the starting of the vehicle engine may also be enabled.

If the monitor main unit 3 incorporates either one or both of the keyless function and the smart function, a user such as the driver of a vehicle or the resident of a building does not need to carry both of the electronic key and the condition monitoring device 100. This would improve the portability. If a vehicle and a building both have the keyless function and the smart function, the user does not need to hold three devices, which are the vehicle key, the building key, and the condition monitoring device 100. This would further improve the portability.

If the keyless function is incorporated in the monitor main unit 3, the information related to the user's environmental state or physical state is transmitted to a base control device when transmitting the ID code signal from the monitor main unit 3 to the base control device, which is arranged in the vehicle or the building. Such information may be used in the base control device.

If the smart function is incorporated in the monitor main unit 3, the information related to the user's environmental state or physical state is transmitted to a base control device when transmitting the ID code signal from the monitor main unit 3 to the base control device, which is arranged in the vehicle or the building. Such information can be used in the base control device. On the other hand, if the base control device transmits the information on the vehicle or the building to the monitor main unit 3 when transmitting the request signal from the base control device to the monitor main unit 3, such information may be used in the monitor main unit 3. For instance, when changing the setting of the base control device, the user may be notified of the change and requested for a so-called answer back.

The present examples and embodiments are to be considered as illustrative and not restrictive, and the invention is not to be limited to the details given herein, but may be modified within the scope and equivalence of the appended claims.

What is claimed is:

1. A comfortable environment providing apparatus that controls at least one comfortable environment creation device to provide a user with a comfortable environment, the comfortable environment providing apparatus comprising:
    a monitor main unit having first and second connection structures and attached to a user wearable band;
    a plurality of sensor units attached to the user wearable band, each monitoring a condition related to the user and outputting detection data representing the monitored condition of the user to the monitor main unit when carried by the user, at least one of the plurality of sensor units monitoring a physical state of the user as the condition related to the user, wherein each sensor unit includes first and second connectors electrically connectable to the monitor main unit or another one of the sensor units, the first connectors of the plurality of sensor units having the same structure, the second connectors of the plurality of sensor units and the first and second connection structures of the monitor main unit having the same structure, and wherein the plurality of sensor units and the monitor main unit that are attached to the same user wearable band are connected in series along the user wearable band; and
    a control circuit for executing control of the at least one comfortable environment creation device so that the detection data approaches comfortable environment reference data quantitatively or numerically indicating a comfortable environment.

2. The comfortable environment providing apparatus according to claim 1, further comprising a storage device storing the comfortable environment reference data, wherein:
    the comfortable environment reference data includes data corresponding to a condition that does not have to be improved; and
    the control circuit determines from the detection data of at least one of the sensor units whether or not the monitored condition should be improved and executes the control of the at least one comfortable environment creation device so that the detection data approaches the comfortable environment reference data.

3. The comfortable environment providing apparatus according to claim 2, wherein after starting to execute control of at least one comfortable environment creation device and when determining from updated detection data of a most recent detection of at least one of the sensor units that a most recently monitored condition no longer has to be improved, the control circuit ends execution of the control and executes a new control of the at least one comfortable environment creation device so as to maintain the comfortable environment.

4. The comfortable environment providing apparatus according to claim 1, further comprising:
    a storage device for storing condition data indicating a specific condition predicted beforehand in association with control content data indicating content of the control executed on the at least one comfortable environment creation device to create a comfortable environment in accordance with the specific condition;
    wherein the control circuit executes control of the at least one comfortable environment creation device in accordance with the control content data when the detection data matches the condition data.

5. The comfortable environment providing apparatus according to claim 1, further comprising:
    an informing device for informing the user of the content of the control executed on the at least one comfortable environment creation device by the control circuit.

6. The comfortable environment providing apparatus according to claim 5, wherein:
    the informing device announces the content of the control to the user before starting execution of the control of the at least on comfortable environment creation device; and
    the control circuit starts execution of the control of the at least one comfortable creation device after the announcement.

7. The comfortable environment providing apparatus according to claim 5, wherein:

the informing device outputs a message describing at least one of the monitored conditions and announces the content of the control before starting execution of the control of the at least one comfortable environment creation device; and the control circuit starts execution of the control of the at least one comfortable environment creation device after the output of the message describing the at least one of the monitored conditions and the announcement of the content of the control.

8. The comfortable environment providing apparatus according to claim 5, wherein:

the informing device outputs a confirmation message confirming whether or not to execute the control of the at least one comfortable environment creation device in accordance with the content of the control; and the control circuit starts execution of the control of the at least one comfortable environment creation device when receiving an affirmative response to the confirmation message.

9. The comfortable environment providing apparatus according to claim 1, further comprising:

a storage device for storing a first comfort level for at least one of the monitored conditions and a second comfort level that is higher than the first comfort level in association with the first comfort level;

wherein when determining that the most recent detection data of the sensor unit monitoring the monitored condition reaches the first comfort level, the control circuit executes control of the at least one comfortable environment creation device so that subsequently detection data of the sensor unit approaches the second comfort level.

10. The comfortable environment providing apparatus according to claim 1, wherein the control circuit generates a control signal for decreasing the difference between the comfortable environment reference data and the detection data and provides the control signal to the at least one comfortable environment creation device.

* * * * *

UNITED STATES PATENT AND TRADEMARK OFFICE
CERTIFICATE OF CORRECTION

PATENT NO. : 7,813,840 B2  
APPLICATION NO. : 11/936983  
DATED : October 12, 2010  
INVENTOR(S) : Mari Suyama et al.

Page 1 of 1

It is certified that error appears in the above-identified patent and that said Letters Patent is hereby corrected as shown below:

On the title page, item [73] should read

Assignee: Kabushiki Kaisha Tokai Rika Denki Seisakusho   Residence: Aichi, Japan Signed and Sealed this
Twenty-sixth Day of July, 2011

David J. Kappos
*Director of the United States Patent and Trademark Office*